United States Patent
Gordon et al.

(10) Patent No.: US 12,286,119 B2
(45) Date of Patent: Apr. 29, 2025

(54) SYSTEM AND METHOD FOR CONNECTED VEHICLE WEATHER SENSING

(71) Applicant: GM GLOBAL TECHNOLOGY OPERATIONS LLC, Detroit, MI (US)

(72) Inventors: Richard Gordon, Rochester Hills, MI (US); Donald K. Grimm, Utica, MI (US); Shawn F. Granda, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 488 days.

(21) Appl. No.: 17/388,558

(22) Filed: Jul. 29, 2021

(65) Prior Publication Data

US 2023/0032379 A1 Feb. 2, 2023

(51) Int. Cl.
*B60W 40/02* (2006.01)
*G01W 1/10* (2006.01)
*H04W 4/46* (2018.01)

(52) U.S. Cl.
CPC .............. *B60W 40/02* (2013.01); *G01W 1/10* (2013.01); *H04W 4/46* (2018.02); *B60W 2555/20* (2020.02)

(58) Field of Classification Search
CPC .... B60W 40/02; B60W 2555/20; H04W 4/46; G01W 1/10
See application file for complete search history.

(56) References Cited

U.S. PATENT DOCUMENTS

| | | | | |
|---|---|---|---|---|
| 11,119,249 | B2* | 9/2021 | Ulmer | G01W 1/08 |
| 11,638,133 | B1* | 4/2023 | O'Grady | H04W 24/08 709/217 |
| 11,804,133 | B2* | 10/2023 | Grace | G07C 5/008 |
| 2017/0075036 | A1* | 3/2017 | Pikhletsky | G01R 33/091 |
| 2017/0371074 | A1* | 12/2017 | Elkabetz | G01W 1/10 |
| 2020/0201346 | A1* | 6/2020 | Jin | G05D 1/0212 |
| 2020/0276977 | A1* | 9/2020 | Saleh | B60W 50/0098 |
| 2020/0309993 | A1* | 10/2020 | Ganshin | G06N 3/084 |
| 2021/0090436 | A1* | 3/2021 | Grace | G08G 1/096741 |
| 2022/0013022 | A1* | 1/2022 | He | G06F 3/04842 |
| 2022/0335823 | A1* | 10/2022 | Constantine | H04L 67/568 |
| 2022/0357480 | A1* | 11/2022 | Spagnuolo Sobrinho | G01W 1/10 |

(Continued)

FOREIGN PATENT DOCUMENTS

WO WO-2020131497 A1 * 6/2020 .............. G01W 1/00

OTHER PUBLICATIONS

Towards Detection of Road Weather Conditions using Large-Scale Vehicle Fleets _ Mercelis et al. (Year: 2020).*

(Continued)

*Primary Examiner* — Yazan A Soofi
*Assistant Examiner* — Ahmed Alkirsh

(57) ABSTRACT

A weather sensing and reporting system includes a filter module configured to receive weather condition data collected by a plurality of vehicles in a reporting region and filter the weather condition data by selectively removing individual samples from the weather condition data based on meteorological quality control standards. A weather condition calculation module is configured to calculate weather conditions in the reporting region based on the filtered weather condition data and a report generation module is configured to generate and transmit a weather report based on the calculated weather conditions.

20 Claims, 4 Drawing Sheets

(56) References Cited

U.S. PATENT DOCUMENTS

2022/0366787 A1* 11/2022 Golov ................. G08G 1/0112

OTHER PUBLICATIONS

Crowdsourcing for Climate and Atmospheric Sciences: 2 Current Status and Future Potential _ C.L. Muller et al. (Year: 2015).*
Towards Detection of Road Weather Conditions using Large-Scale Vehicle Fleets (Year: 2000).*
Mercelis et al. Towards Detection of Road Weather Conditions using Large-Scale Vehicle Fleets (Year: 2020).*
Towards Detection of Road Weather Conditions using Large-Scale Vehicle Fleets_Mercelis et al. (Year: 2017).*

* cited by examiner

SYSTEM AND METHOD FOR CONNECTED VEHICLE WEATHER SENSING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to using data received from vehicle sensors to accurately determine weather conditions.

A vehicle may include various sensors, such as moisture and rain sensors, temperature sensors, cameras, radar sensors, lidar sensors, etc., for detecting environmental conditions. In some examples, various vehicle functions (e.g., heating and cooling, traction control, windshield wipers, etc.) may be controlled based on the detected environmental conditions.

SUMMARY

A weather sensing and reporting system includes a filter module configured to receive weather condition data collected by a plurality of vehicles in a reporting region and filter the weather condition data by selectively removing individual samples from the weather condition data based on meteorological quality control standards. A weather condition calculation module is configured to calculate weather conditions in the reporting region based on the filtered weather condition data and a report generation module is configured to generate and transmit a weather report based on the calculated weather conditions.

In other features, the weather condition data includes at least one of temperature data, precipitation data, and atmospheric pressure data.

In other features, the meteorological quality control standards include at least one of national standards, local standards, and standards of a target weather reporting service.

In other features, the filter module is configured to determine whether the individual samples are within a predetermined range for a corresponding weather condition.

In other features, the filter module is configured to remove the individual samples that are not within the predetermined range from the weather condition data.

In other features, the filter module is configured to determine whether respective rates of change of the individual samples are within a predetermined range compared to previously collected individual samples.

In other features, the filter module is configured to remove the individual samples from the weather condition data based on respective types of vehicles that provided the individual samples.

In other features, to calculate the weather conditions in the reporting region, the weather condition calculation module is configured to calculate first averages of individual samples of the filtered weather condition data in respective sub-regions of the reporting region and calculate a second average of the first averages.

In other features, the weather report includes at least one of the first averages and the second average.

In other features, the weather report includes a plurality of mapping layers each corresponding to a different one of the calculated weather conditions.

In other features, the weather sensing and reporting system further includes a display configured to display selected ones of the plurality of mapping layers.

A method of sensing and reporting weather includes receiving weather condition data collected by a plurality of vehicles in a reporting region, filtering the weather condition data by selectively removing individual samples from the weather condition data based on meteorological quality control standards, calculating weather conditions in the reporting region based on the filtered weather condition data, and generating and transmitting a weather report based on the calculated weather conditions.

In other features, the weather condition data includes at least one of temperature data, precipitation data, and atmospheric pressure data.

In other features, the meteorological quality control standards include at least one of national standards, local standards, and standards of a target weather reporting service.

In other features, the method further includes determining at least one of whether the individual samples are within a predetermined range for a corresponding weather condition and whether respective rates of change of the individual samples are within a predetermined range compared to previously collected individual samples.

In other features, the method further includes removing the individual samples that are not within the predetermined range from the weather condition data.

In other features, the method further includes removing the individual samples from the weather condition data based on respective types of vehicles that provided the individual samples.

In other features, the method further includes calculating first averages of individual samples of the filtered weather condition data in respective sub-regions of the reporting region and calculating a second average of the first averages, wherein the weather report includes at least one of the first averages and the second average.

In other features, the weather report includes a plurality of mapping layers each corresponding to a different one of the calculated weather conditions.

In other features, the method further includes displaying selected ones of the plurality of mapping layers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Weather prediction and reporting services may crowdsource data indicative of weather conditions (e.g., temperatures, precipitation, etc.) from multiple individuals and locations. Crowdsourced data indicative of weather conditions may be spatially biased. In other words, a greater number of samples may originate from high population or high traffic locations (e.g., locations that generally include more people, infrastructure, etc.). Conversely, fewer samples originate from locations that include fewer people or other types of sample points. Accordingly, average reported temperatures, precipitation, etc. in a given area or region will be skewed by sub-regions within that area that provide a greater number of samples and weather reports based on the data may not accurately reflect variations in weather conditions within the area. Further, anomalies or inaccuracies that may occur in a sub-region are amplified if a greater number of samples originate from that sub-region.

Weather sensing systems and methods according to the present disclosure perform filtering and validation on weather condition data crowdsourced from vehicles and compensate for spatial bias. For example, data received from individual vehicles may be validated in accordance with meteorological quality control standards (e.g., national standards, local standards, standards of a target weather reporting service, etc.). Further, data from specific vehicles and/or vehicle type, vehicles in particular locations, etc. may be excluded.

Although described with respect to vehicles and data received from vehicle sensors, the principles of the present disclosure may also be applied to non-vehicle implementations.

Figure 1:
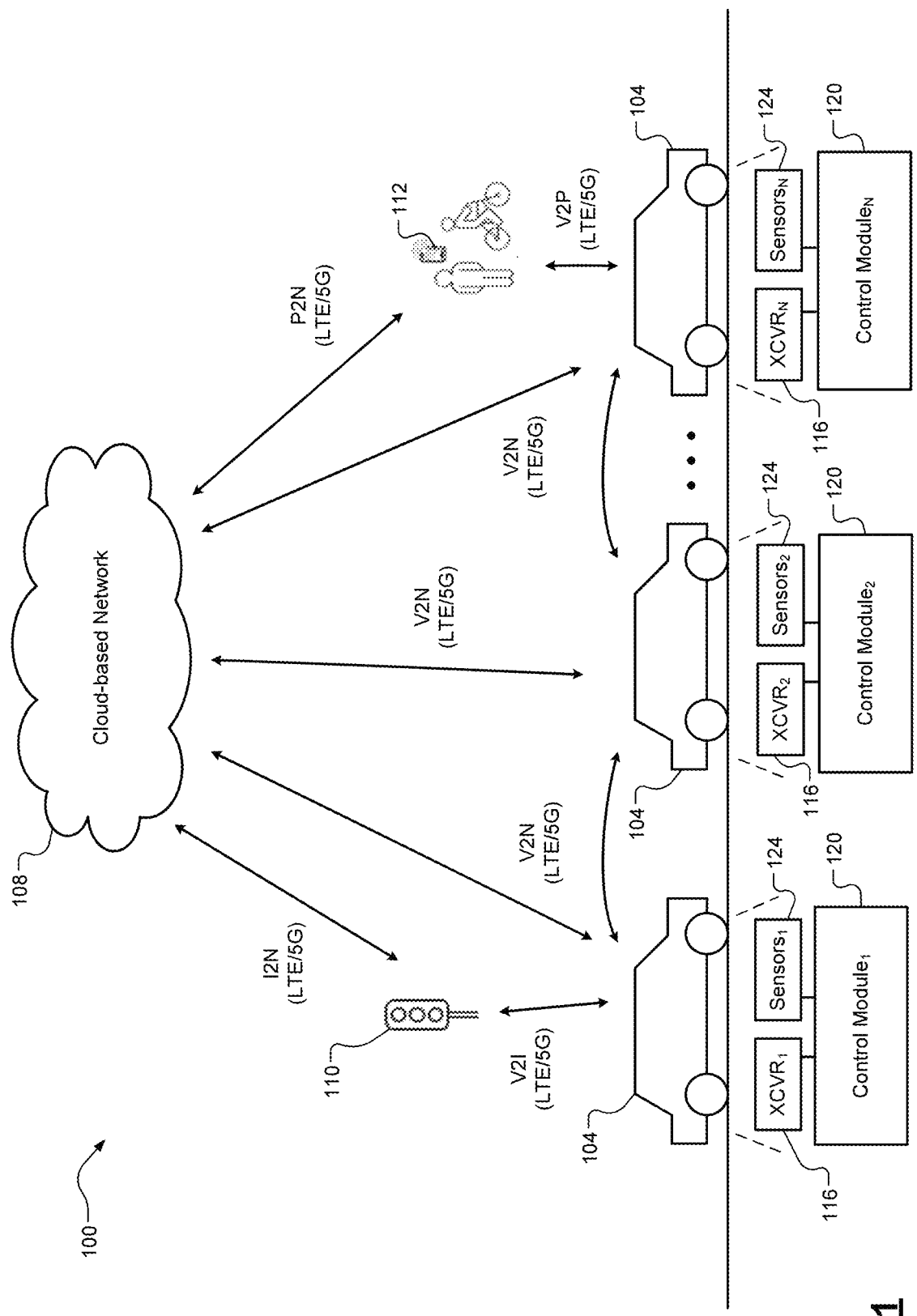
FIG. 1 is a functional block diagram of an example weather sensing system according to the present disclosure.

FIG. 1 shows a weather sensing and reporting system 100 according to the present disclosure. The weather sensing and reporting system 100 includes vehicles 104 and a cloud-based network 108 configured to collect data from the vehicles 104. The cloud-based network 108 provides computing and storage services from a centralized location. In some examples, the weather sensing and reporting system 100 further includes infrastructure devices 110 and/or personal mobile network devices 112. The infrastructure devices 110 may include traffic signals, traffic signs, devices mounted on buildings and/or roadway structures, etc.

The vehicles 104 may each include transceivers 116, control modules 120, and sensors 124. The vehicles 104 may communicate with the cloud-based network 108 via vehicle-to-network (V2N) communication links, such as LTE and 5G links. The vehicles 104 may communicate with the infrastructure devices 110 via vehicle-to-infrastructure (V2I) communication links, such as a long-term evolution (LTE) or 5th generation (5G) links. The vehicles 104 may communicate with the personal mobile network devices 112 via vehicle-to-person (V2P) communication links, such as LTE and 5G links. The infrastructure devices 110 and the personal mobile network devices 112 may also communicate with the cloud-based network 108 via communication links such as infrastructure-to-network (I2N) and person-to-network (P2N) links, respectively (e.g., LTE and 5G links).

The sensors 124 may be located throughout the vehicles 104 and include, but are not limited to, rain sensors, temperature sensors, cameras, infrared (IR) sensors, radar sensors, lidar sensors, yaw rate sensors, accelerometers, global positioning system (GPS) sensors, etc. The control module 120 and the sensors 124 may be in direct communication with each other, may communicate with each via a controller area network (CAN) bus and/or via an Ethernet switch, using wireless communication, etc. Sensor data may further be transmitted to the cloud-based network 108 and/or other remote processing devices, such as micro-data centers deployed at cellular towers and/or at regional stations. For example, the control modules 120 are configured to receive and process sensor data and interface with the transceivers 116 to selectively provide the sensor data to the cloud-based network 108.

The weather sensing and reporting system 100 according to the present disclosure is configured to collect sensor data (e.g., weather condition data) from the vehicles 104 using the cloud-based network 108 and perform filtering and validation on the sensor data as described below in more detail.

Figure 2:
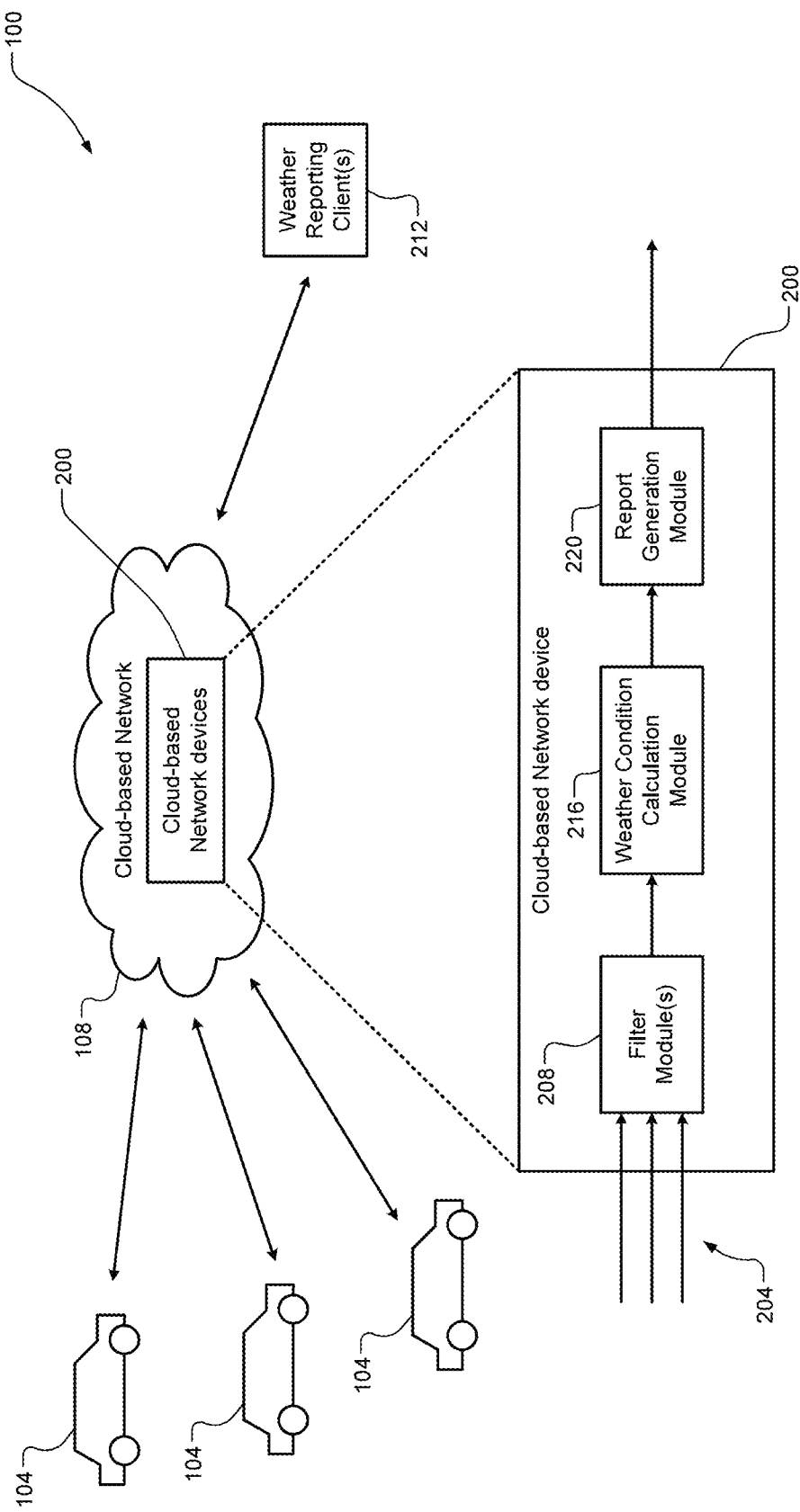
FIG. 2 is a functional block diagram of a weather sensing system including an example cloud-based network device according to the present disclosure.

Referring now to FIG. 2 and with continued reference to FIG. 1, the cloud-based network 108 of the weather sensing and reporting system 100 includes a plurality of cloud-based network devices 200 in a distributed network including servers, memory devices with stored databases, etc. Although only one network device 200 is shown in detail, functions of the network device 200 as described below can be performed in a single device, distributed among a plurality of devices in different locations, etc.

The network device 200 receives sensor data 204 collected from a plurality of the vehicles 104 in different locations. In other words, the network device 200 receives crowdsourced or crowd-sensed sensor data. The sensor data includes data indicative of weather data including, but not limited to, temperature data, atmospheric pressure data, and precipitation data (referred to herein as weather condition data). For example, the temperature data may correspond to temperatures sensed by temperature sensors in respective vehicles. The precipitation data may correspond to precipitation sensed by rain or moisture sensors in respective vehicles and/or other data indicative of precipitation (e.g., windshield wiper activation, windshield wiper speed, etc.).

The network device 200 includes one or more filter modules 208 configured to filter and/or validate individual samples of the weather condition data. For example, the filter modules 208 are configured selectively filter and validate weather condition data in accordance with meteorological quality control standards (e.g., national standards, local standards, standards of a target weather reporting service, etc.). As one example, quality control standards may be based on quality control standards of one or more weather reporting clients 212. For example, the weather reporting clients 212 may include, but are not limited to, local departments of transportation, local or national weather services, smartphone apps, individual subscribers of weather reporting services, owners/drivers of the vehicles 104, etc.

For example, the filter modules 208 include a validity filter and a reliability filter. The validity filter determines whether each sample of weather condition data (e.g., each measurement from each of the vehicles 104) is within a plausible or expected range (e.g., minimum and maximum limits) for a particular weather condition in a corresponding region and time of year. For example, for temperature data, the expected range may be defined by a minimum temperature Min and a maximum temperature Max. The validity filter excludes received temperature measurements outside of the expected range. For example, the temperature measurements outside of the expected range are discarded and not provided to a weather condition calculation module 216.

The minimum temperature Min may be significantly less a minimum recorded temperature for the region and time of year. In other words, if a historical minimum recorded temperature for the region and time of year is 20 degrees Celsius, Min may be set to 0 degree Celsius. Conversely, the maximum temperature Max may be significantly greater a historical maximum recorded temperature for the region and time of year. In this manner, the expected range is set to ensure that no valid temperature measurements are excluded. For example only, the validity filter is applied to a measurement m to provide a validated measurement $m^v$ according to $m^v=m$ for m between Min and Max, else $m^v$=null.

Similarly, the reliability filter determines whether each sample of weather condition data (e.g., compared to a previous sample for the same vehicle 104 indicates a rate of change within a plausible or expected range in a corresponding region and time of year. For example, the reliability filter compares a current measurement $m_t$ to a previous measurement $m_{t-1}$ and selectively discards the measurement if $m_t$-$m_{t-1}$ (e.g., an absolute value of a difference between $m_t$ and $m_{t-1}$) is greater than a change threshold for a particular timeframe (e.g., one hour, one day, etc.).

The filter modules 208 may implement other filter mechanisms to selectively exclude measurements. For example, outliers (e.g., measurements that vary from an average of all measurements in a given region and timeframe by a predetermined threshold) may be excluded.

The filter modules 208 may be further configured to exclude data from specific vehicles, vehicle types (e.g., selected makes, models, and/or model years), vehicles in particular locations, etc. For example, measurements from a specific vehicle may be consistently inaccurate due to sensor failure. The filter modules 208 may therefore exclude all measurements received from that vehicle (e.g., if multiple measurements from that vehicle are excluded in a given timeframe, such as two or more measurements excluded in an hour, if consecutive measurements are excluded, etc.).

Similarly, entire vehicle types (for example only, vehicles of a specific make, model, and model year) may be excluded or dis-enrolled from the weather sensing and reporting system 100. For example, the weather sensing and reporting system 100 may periodically (e.g., monthly, semi-annually, annually, etc.) assess the accuracy of measurements across all vehicles. If measurements provided by a particular vehicle type during a timeframe are consistently inaccurate then measurements from all vehicles of that vehicle type may be excluded from future weather calculations. As one example, measurements for a vehicle type may be considered inaccurate based on comparisons to averages of measurements from all vehicles and/or actual weather conditions at the time of measurement, a number or rate of measurements from that vehicle type that were excluded, etc. For example only, a vehicle type being excluded may indicate that respective sensors or other components in that vehicle type related to weather condition sensing are faulty or inaccurate.

The filter modules 208 provide the validated data (i.e., validated measurements received from the vehicles 104 that were not excluded) to the weather condition calculation module 216. The weather condition calculation module 216 is configured to calculate weather conditions (e.g., values or estimates of weather conditions, such as a temperature, precipitation level or intensity, atmospheric pressure, etc. in a report region) based on the validated measurements. A report generation module 220 is configured to generate a weather report for transmission to the weather reporting clients 212, the vehicles 104, etc. based on the calculated weather conditions.

Figure 3B:
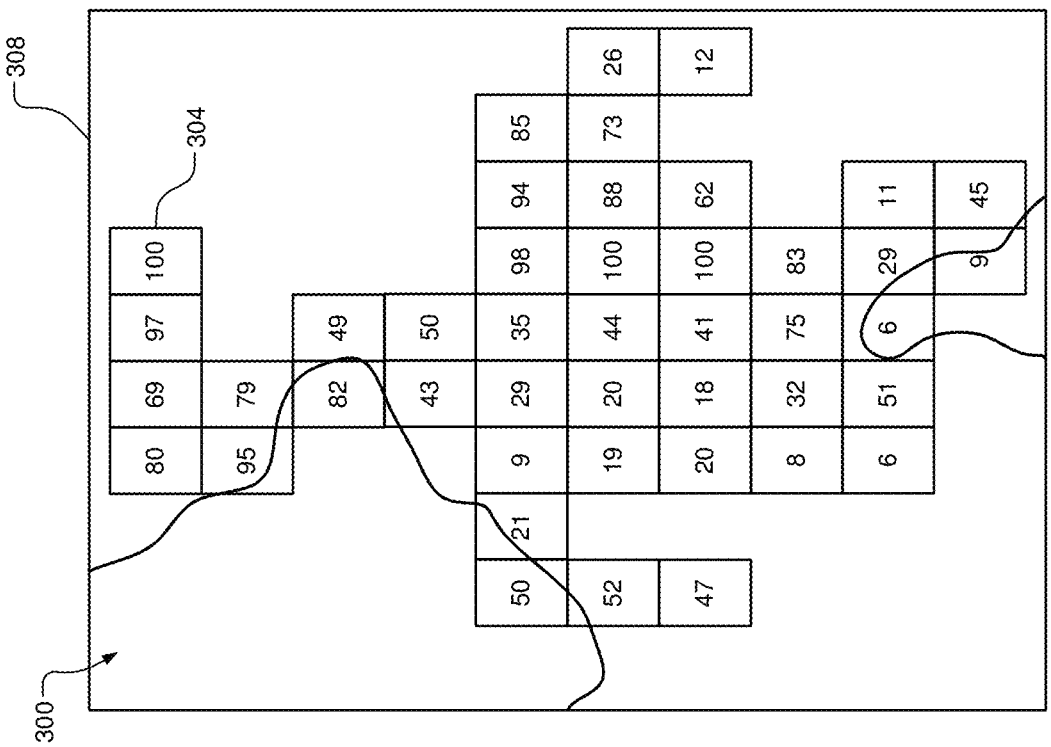
FIG. 3B is an example mapping layer of a report region according to the present disclosure.
Figure 3A:
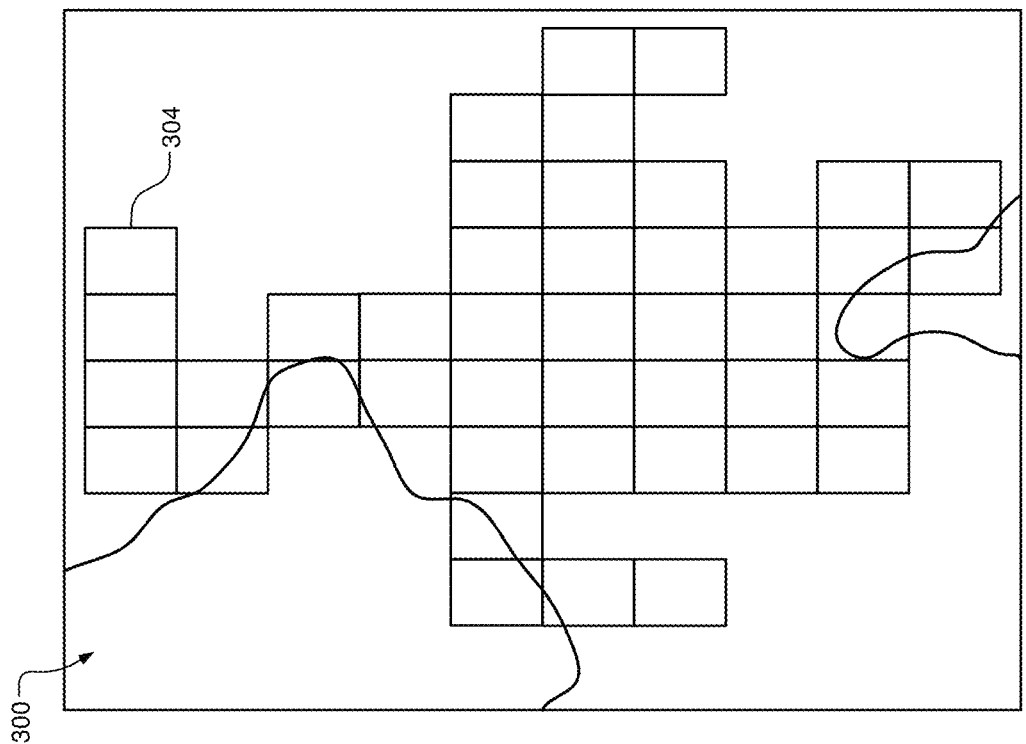
FIG. 3A is an example report region of a weather sensing system according to the present disclosure.

For example, as shown in FIG. 3A, a report area or region (e.g., a 11 km×8 km report region) 300 may be divided into multiple sample areas or sub-regions (e.g., 1.1 km×0.8 km sub-regions) 304. Some areas of the reporting region 300 may not include any of the sub-regions 304 (e.g., areas with no vehicles, such as mountains, bodies of water, etc.). The sub-regions 304 may be uniform or non-uniform. The weather condition calculation module 216 calculates a respective sub-region average $P_S$ of the measurements in each of the sub-regions 304 (e.g., to generate multiple, different sub-region averages). The weather condition calculation module 216 then calculates a region average PR of all of the sub-region averages $P_S$ in the region 300.

In other words, the weather measurement (e.g., a temperature) calculated for a given region 300 is not simply an average of all measurements received in the region 300. In this manner, spatial bias caused by a greater number of samples being received from high-traffic sub-regions is minimized. For example, a high-traffic sub-region may include hundreds or thousands of vehicles providing measurements. Conversely, an adjacent, low-traffic sub-region may only include one or several vehicles providing measurements. Measurement differences may be caused by actual temperature differences or may be caused by factors including, not limited to, vehicle types, road types, geographical features, local environmental features (e.g., the presence or absence of trees, bodies of water, buildings or other structures), etc. However, since the measurements in each respective sub-region 304 are separately averaged, the sub-region average $P_S$ of each sub-region 304 is given equal weight when combined with other sub-region averages. In this manner, measurement differences caused by anomalous factors in different sub-regions are mitigated.

Referring now to FIG. 3B, measurement data for the region 300 may be provided in different mapping layers for respective types of measurements (e.g., temperature, precipitation, wiper usage, barometric pressure, snow type or likelihood, etc.). For example, a mapping layer 308 may be selected from among the different mapping layers and displayed (e.g., on a vehicle infotainment display). The selected mapping layer 308 identifies measurement data for each of the sub-regions 304 in the region 300.

As shown, the mapping layer 308 corresponds to a wiper usage mapping layer. For example, each sub-region 304 identifies a percentage of vehicles in that sub-region 304 that activated their windshield wipers in a given sampling period. In other examples, each sub-region 304 may identify an average wiper intensity for the vehicles in that sub-region 304. In this manner, different mapping layers may indicate not only the likelihood of precipitation but also the intensity of the precipitation, the likelihood of road splash events, etc.

Similarly, each sub-region 304 in a temperature mapping layer may identify an average temperature reported by vehicles in that sub-region 304, each sub-region 304 in a barometric pressure mapping layer may identify an average barometric pressure reported by vehicles in that sub-region 304, etc.

Figure 4:
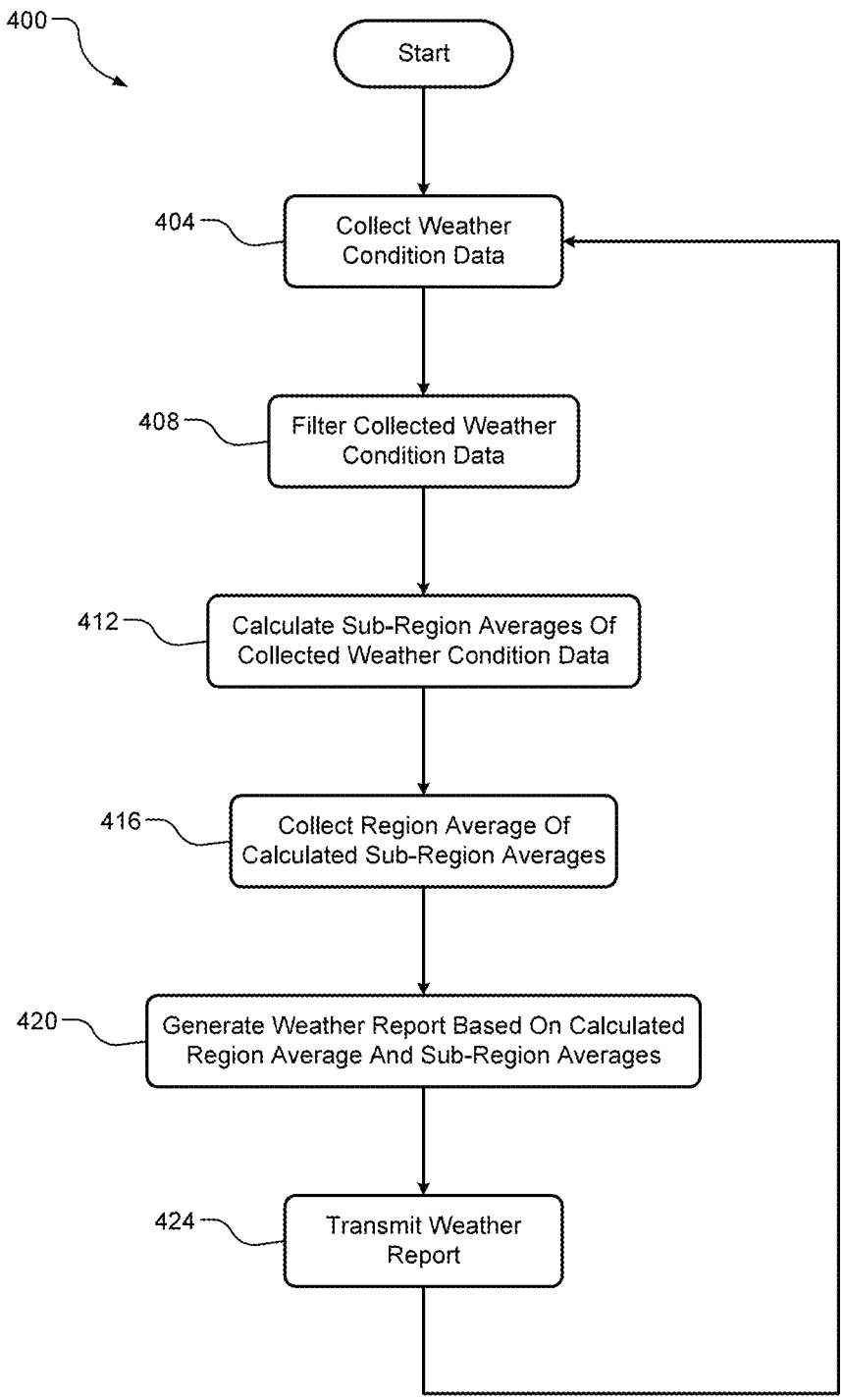
FIG. 4 illustrates steps of an example method of providing weather reports according to the present disclosure.

Referring now to FIG. 4, an example method 400 of providing weather reports according to the present disclosure is shown. At 404, weather condition data is collected from a plurality of vehicles in different locations in a reporting region (e.g., using cloud-based network devices 200). For example, vehicles located in different sub-regions of a reporting region generate and transmit weather condition data (e.g., based on sensor data, wiper usage, etc.) to the cloud-based network 108.

At 408, the method 400 (e.g., the filter modules 208) filters the collected weather condition data. For example, the method 400 filters out samples based on meteorological quality control standards, reliability and validity standards, vehicle types, etc. as described above. At 412, the method 400 (e.g., the weather condition calculation module 216) calculates a sub-region average of the weather condition data for each sub-region in the reporting region. At 416, the method 400 (e.g., the weather condition calculation module 216) calculates a region average of all of the sub-region averages for each weather condition (e.g., precipitation, wiper usage, temperature, etc.).

At 420, the method 400 (e.g., the report generation module 220) generates a weather report for transmission to the weather reporting clients 212, the vehicles 104, etc. based on the calculated sub-region averages and region average. For example, the weather report may include a region average to be used to provide weather real-time weather condition reporting, weather condition predictions and likelihoods, etc. The weather reporting clients 212 may use the region averages to provide weather reporting services to clients, customers, viewers, etc. Conversely, the region average may be provided directly to users such as the vehicles 104, the personal mobile network devices 112, etc.

The weather report may also include weather condition data representative of the sub-region averages in each reporting region, such as data categorized into different mapping layers as described above. Accordingly, users (e.g., using interfaces and displays within the vehicles 104, the personal mobile network devices 112, etc.) may select a desired mapping layer from among a plurality of mapping layers and the weather condition data is displayed in accordance with the selected mapping layer.

At 424, the method 400 transmits the weather report to the weather reporting clients 212, the vehicles 104, and/or the personal mobile network devices 112. The method 400 then continues to collect weather condition data at 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A weather sensing and reporting system, comprising:
a filter module configured to (i) receive weather condition data collected by a plurality of vehicles in a reporting region and (ii) filter the weather condition data, wherein filtering the weather condition data includes selectively removing individual samples from the weather condition data based on meteorological quality control standards,
wherein the filter module includes a validity filter and a reliability filter, the validity filter configured to determine whether each sample of weather condition data is within a range for a particular weather condition in a corresponding region and time of year, to exclude weather condition data that is from vehicles outside of the range, to exclude weather condition data from specified vehicles, to exclude weather condition data from specified vehicle makes, to exclude weather condition data from specific vehicle models, to exclude weather condition data from vehicles in predetermined locations, and to exclude weather condition data based on the meteorological quality control standards;
the plurality of vehicles in the reporting region, at least one of the vehicles configured to control at least one vehicle function based on the weather condition data;
a weather condition calculation module configured to calculate weather conditions in the reporting region based on the filtered weather condition data;
a report generation module configured to generate and transmit a weather report based on the calculated weather conditions; and
wherein a vehicle of the plurality of vehicles includes a control module configured to, based on the calculated weather conditions, control at least one of heating and cooling of a vehicle, traction control of a vehicle, and windshield wipers of the vehicle.

2. The weather sensing and reporting system of claim 1, wherein the weather condition data includes at least one of temperature data, precipitation data, and atmospheric pressure data.

3. The weather sensing and reporting system of claim 1, wherein the meteorological quality control standards include at least one of national standards, local standards, and standards of a target weather reporting service.

4. The weather sensing and reporting system of claim 1, wherein the filter module is configured to determine whether the individual samples are within a predetermined range for a corresponding weather condition.

5. The weather sensing and reporting system of claim 4, wherein the filter module is configured to remove the individual samples that are not within the predetermined range from the weather condition data.

6. The weather sensing and reporting system of claim 1, wherein the filter module is configured to determine whether respective rates of change of the individual samples are within a predetermined range compared to previously collected individual samples.

7. The weather sensing and reporting system of claim 1, wherein the filter module is configured to remove the individual samples from the weather condition data based on respective types of vehicles that provided the individual samples.

8. The weather sensing and reporting system of claim 1, wherein, to calculate the weather conditions in the reporting region, the weather condition calculation module is configured to calculate first averages of individual samples of the filtered weather condition data in respective sub-regions of the reporting region and calculate a second average of the first averages.

9. The weather sensing and reporting system of claim 8, wherein the weather report includes at least one of the first averages and the second average.

10. The weather sensing and reporting system of claim 1, wherein the weather report includes a plurality of mapping layers each corresponding to a different one of the calculated weather conditions.

11. The weather sensing and reporting system of claim 10, further comprising a display configured to display selected ones of the plurality of mapping layers.

12. A method of sensing and reporting weather, comprising:
receiving weather condition data collected by a plurality of vehicles in a reporting region;
by at least one of the vehicles in the reporting region, controlling at least one vehicle function based on the weather condition data;

filtering the weather condition data, wherein filtering the weather condition data includes selectively removing individual samples from the weather condition data based on meteorological quality control standards, wherein the filtering includes validity filtering and reliability filtering, the validity filtering including determining whether each sample of weather condition data is within a range for a particular weather condition in a corresponding region and time of year, excluding weather condition data that is from vehicles outside of the range, excluding weather condition data from specified vehicles, excluding weather condition data from specified vehicle makes, excluding weather condition data from specific vehicle models, excluding weather condition data from vehicles in predetermined locations, and excluding weather condition data based on the meteorological quality control standards;

calculating weather conditions in the reporting region based on the filtered weather condition data;

generating and transmitting a weather report based on the calculated weather conditions; and based on the calculated weather conditions, controlling at least one of heating and cooling of a vehicle, traction control of a vehicle, and windshield wipers of a vehicle.

13. The method of claim 12, wherein the weather condition data includes at least one of temperature data, precipitation data, and atmospheric pressure data.

14. The method of claim 12, wherein the meteorological quality control standards include at least one of national standards, local standards, and standards of a target weather reporting service.

15. The method of claim 12, further comprising determining at least one of (i) whether the individual samples are within a predetermined range for a corresponding weather condition and (ii) whether respective rates of change of the individual samples are within a predetermined range compared to previously collected individual samples.

16. The method of claim 15, further comprising removing the individual samples that are not within the predetermined range from the weather condition data.

17. The method of claim 12, further comprising removing the individual samples from the weather condition data based on respective types of vehicles that provided the individual samples.

18. The method of claim 12, further comprising calculating first averages of individual samples of the filtered weather condition data in respective sub-regions of the reporting region and calculating a second average of the first averages, wherein the weather report includes at least one of the first averages and the second average.

19. The method of claim 12, wherein the weather report includes a plurality of mapping layers each corresponding to a different one of the calculated weather conditions.

20. The method of claim 19, further comprising displaying selected ones of the plurality of mapping layers.

* * * * *